US012597334B2

(12) United States Patent
R

(10) Patent No.: US 12,597,334 B2
(45) Date of Patent: Apr. 7, 2026

(54) ALARM SYSTEM DETECTOR GEOFENCING

(71) Applicant: Honeywell International Inc., Charlotte, NC (US)

(72) Inventor: Murali R, Hosur (IN)

(73) Assignee: Honeywell International Inc., Charlotte, NC (US)

( * ) Notice: Subject to any disclaimer, the term of this patent is extended or adjusted under 35 U.S.C. 154(b) by 506 days.

(21) Appl. No.: 18/082,034

(22) Filed: Dec. 15, 2022

(65) Prior Publication Data

US 2024/0203233 A1 Jun. 20, 2024

(51) Int. Cl.
| | |
|---|---|
| *G08B 25/00* | (2006.01) |
| *G08B 25/10* | (2006.01) |
| *H04B 17/318* | (2015.01) |
| *H04W 4/02* | (2018.01) |
| *H04W 4/021* | (2018.01) |
(Continued)

(52) U.S. Cl.
CPC ........... *G08B 25/009* (2013.01); *G08B 25/10* (2013.01); *H04B 17/318* (2015.01); *H04W 4/021* (2013.01); *H04W 4/023* (2013.01); *H04W 4/029* (2018.02); *H04W 4/80* (2018.02)

(58) Field of Classification Search
CPC .... G08B 25/009; G08B 25/10; H04B 17/318; H04W 4/029; H04W 4/80; H04W 4/021; H04W 4/023
See application file for complete search history.

(56) References Cited

U.S. PATENT DOCUMENTS

| | | | | |
|---|---|---|---|---|
| 9,792,808 B2 * | 10/2017 | Gnanasekaran | ..... | G08B 25/002 |
| 2014/0009284 A1 * | 1/2014 | Slavin | ................ | G08B 13/2491 |
| | | | | 340/539.13 |
| 2016/0217668 A1 * | 7/2016 | Meganathan | ........... | H04W 4/80 |

(Continued)

FOREIGN PATENT DOCUMENTS

| | | |
|---|---|---|
| EP | 3051510 | 8/2016 |
| EP | 3280116 | 2/2018 |

(Continued)

OTHER PUBLICATIONS

Coitos , et al., "MOG—A Smart Mobile System for Interactive Museum Visits"; International Conferences ICT, Society, and Human Beings 2019 (8 pgs).

(Continued)

*Primary Examiner* — Erika A Washington
(74) *Attorney, Agent, or Firm* — Brooks, Cameron & Huebsch, PLLC

(57) ABSTRACT

Systems, methods, and processes of alarm system detector geofencing are described herein. One method, includes defining, a geofenced area within a facility, the geofenced area defined by a communication range of a communication functionality of at least one of a number of event detection devices of a facility event detection alarm system, using the communication functionality to communicate between the number of event detection devices and a portable device wherein the portable device and at least one of the event detection devices are within a threshold communication range of each other, and determining whether the portable device is within the geofenced area based on the communication between the portable device and at least one of the event detection devices.

18 Claims, 5 Drawing Sheets

(51) Int. Cl.
  _H04W 4/029_ (2018.01)
  _H04W 4/80_ (2018.01)

(56) References Cited

U.S. PATENT DOCUMENTS

2018/0160260 A1 * 6/2018 Meganathan ......... H04W 4/029
2020/0027038 A1   1/2020 Oliver et al.
2022/0358827 A1 * 11/2022 Hansen ................. H04W 4/021

FOREIGN PATENT DOCUMENTS

WO    WO 2015/006858 A1 * 1/2015 ............. A01G 22/00
WO       2016196496 A1   12/2016

OTHER PUBLICATIONS

Liu , et al., "TAR—Enabling Fine-Grained Targeted Advertising in Retail Stores"; MobiSys '18, Jun. 10-15, 2018 (14 pgs).

* cited by examiner

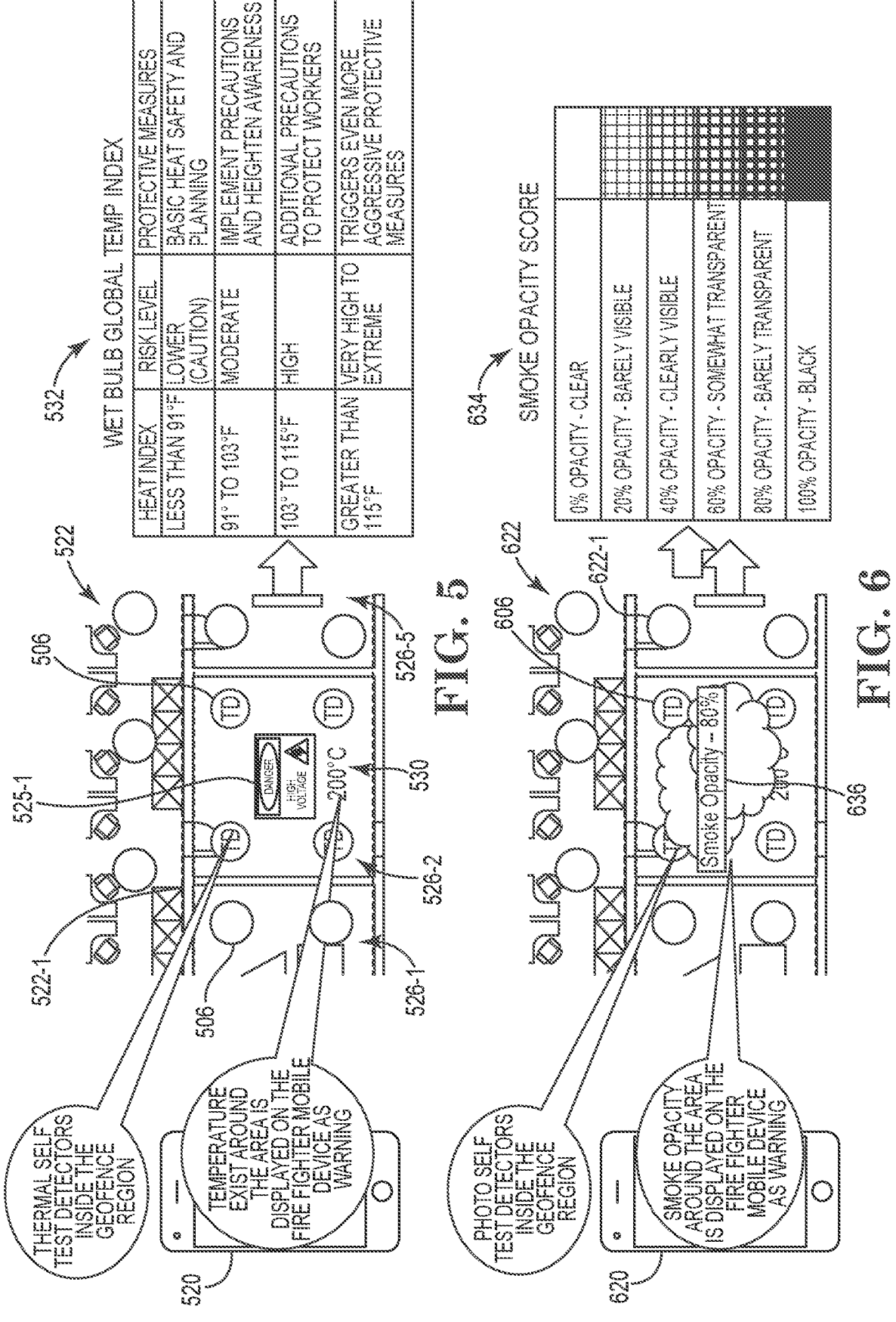

FIG. 5

WET BULB GLOBAL TEMP INDEX

| HEAT INDEX | RISK LEVEL | PROTECTIVE MEASURES |
|---|---|---|
| LESS THAN 91°F | LOWER (CAUTION) | BASIC HEAT SAFETY AND PLANNING |
| 91° TO 103°F | MODERATE | IMPLEMENT PRECAUTIONS AND HEIGHTEN AWARENESS |
| 103° TO 115°F | HIGH | ADDITIONAL PRECAUTIONS TO PROTECT WORKERS |
| GREATER THAN 115°F | VERY HIGH TO EXTREME | TRIGGERS EVEN MORE AGGRESSIVE PROTECTIVE MEASURES |

FIG. 6

SMOKE OPACITY SCORE

| |
|---|
| 0% OPACITY - CLEAR |
| 20% OPACITY - BARELY VISIBLE |
| 40% OPACITY - CLEARLY VISIBLE |
| 60% OPACITY - SOMEWHAT TRANSPARENT |
| 80% OPACITY - BARELY TRANSPARENT |
| 100% OPACITY - BLACK |

ALARM SYSTEM DETECTOR GEOFENCING

TECHNICAL FIELD

The present disclosure relates to systems, methods, and processes of creating and using alarm system detector geofencing in an area within a facility.

BACKGROUND

Facilities equipped with alarm systems allow for early detection of an emergency event, such as a fire or presence of a harmful chemical situation occurring. This allows for emergency personnel to arrive more quickly.

The systems utilize sensing devices (e.g., fire detectors, smoke detectors, chemical sensors, hand pull devices, etc.) spread throughout the facility that can detect when an event may be occurring. These alarm system devices communicate sensor information to an on premise alarm system control panel that collects and analyzes the data to determine whether an emergency event is occurring, and contacts emergency personnel to come to the facility to deal with the event.

Typically, such facilities are large and can be complex (e.g., large building, multiple floors, facilities with multiple buildings). Thus, it may be difficult for emergency personnel to navigate the facility, especially, for example, once smoke begins to fill the interior spaces of the facility. This can include finding the correct stairways, room, and hallways, etc.

In some situations, a map, for example, from a building information model (BIM), can be generated and used by emergency personnel, but it may be incomplete or incorrect and may not identify restricted areas or areas with hazards therein that may lead to delays in getting to the emergency or increased risk to the emergency responders. Further, it does not provide information to guide the emergency personnel to the right location, particularly in real-time (live guidance).

Additionally, during service of the alarm system, technicians may need guidance in navigating the facility to perform repairs or replacement of alarm system devices, add new devices to the system through a commissioning process, and/or perform a walk test to visually inspect the devices and/or check their functionality via in-person physical inspection. For example, the technician may be new to the facility and/or the layout of the interior space of the facility is confusing. Or there may be many devices in an area that are to be serviced and it may be difficult to determine which alarm system device needs service or what type of service a particular device needs. Such issues can slow progress of emergency personnel or alarm system technicians and may result in inefficient service or potentially loss of property or life of building occupants.

BRIEF DESCRIPTION OF THE DRAWINGS

FIG. 5 is an example of an event occurring on an event alarm system in accordance with one or more embodiments of the present disclosure.

FIG. 6 is another example of an event occurring on an event alarm system in accordance with one or more embodiments of the present disclosure.

DETAILED DESCRIPTION

Figure 1:
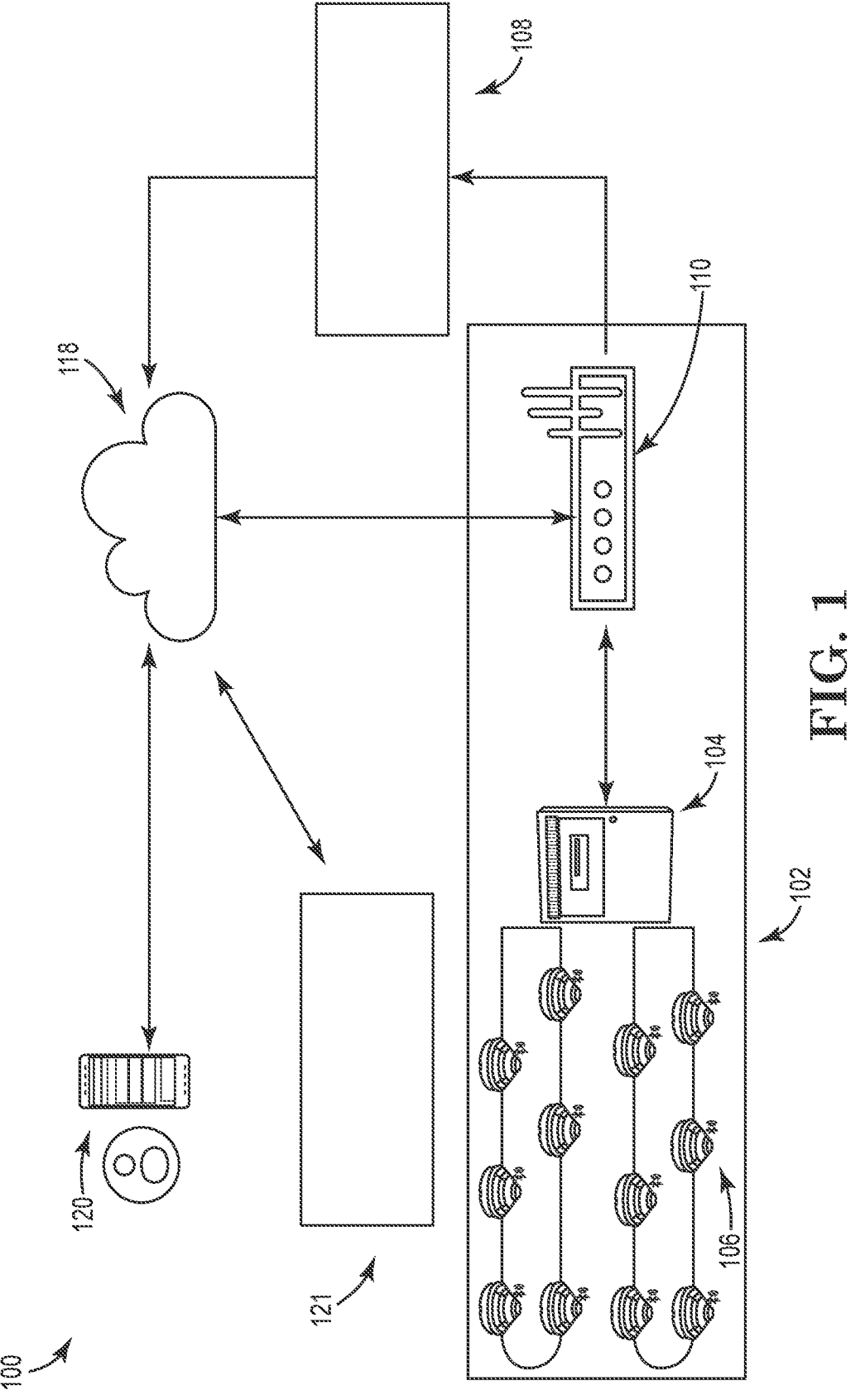
FIG. 1 is an example of an event alarm system in accordance with one or more embodiments of the present disclosure.

Systems, methods, and processes of creating and using alarm system detector geofencing in an area within a facility are described herein. Presently, there is no mechanism in a building safety system to use event detectors with built-in communication components to geofence areas of a facility, provide hazard information, in some cases in real-time, or to guide personnel to exact locations during maintenance or a building safety event utilizing geofencing and/or hazard information.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a building safety event notification system for use in accordance with one or more embodiments of the present disclosure. In the illustrated embodiment, the building safety event notification system 100 includes an alarm system 102, a central monitoring station having at least one computing device 108, a remote server (e.g., cloud server) 118, a portable device 120, and one or more building owner/operator/emergency personnel communication application devices 121.

An event alarm signal is generated in response to data from one or more alarm system event detection devices 106 (e.g., smoke detectors) within the alarm system 102 indicating that an event (e.g., fire) may be occurring. As used herein, the term "event" may refer to any condition occurring within the building, such as a fire, smoke, or chemical sensor activation, an alarm trigger (pull station), or a breach of security.

It may also be referred to as a fault detected in any of the components of the system 100, such as a fault in one or more of the alarm system event detection devices 106. The central monitoring station may be staffed by employees of the provider of the alarm system 102, and they may not know specific details of each building they are monitoring, but rather, are charged with alerting appropriate emergency event response personnel based on the type of response needed and coordinating the response to the building to address the event that is occurring at the building.

The alarm system 102 can be any system that is used to monitor events that will affect occupants of the building. As shown in FIG. 1, the alarm system illustrated is a fire alarm system and includes a number of alarm system event detection devices 106 and a control panel 104 for managing the operation of the alarm system 102 and its devices.

As used herein, the term "control panel" refers to a device at the facility to control components of an alarm system of a facility (building). For example, the control panel 104 can be a fire control panel that can receive information from event detection devices (fire detectors, smoke detectors) 106 and determine whether an emergency event (a fire) is occurring or has occurred.

The control panel may be configured to transmit information about the emergency event to the computing device 108 and to the cloud 118. This information, may include, for example, a unique identifier of the event detection device 106 which detected the event, a date and time of the event, a status of the event (e.g., resolved, unresolved), or an event type (e.g., smoke detected, communication fault).

The control panel 104 is connected to the number of alarm system event detection devices 106 to send instructions to and receive data from devices 106. As used herein, the term "alarm system event detection device" refers to a device that can receive an input relating to an event. Such alarm system event detection devices 106 can be a part of an alarm system of the facility and can include devices such as fire sensors, smoke detectors, heat detectors, carbon monoxide (CO) detectors, other chemical detector, or combinations of these; interfaces; pull stations; input/output modules; aspirating units; and/or audio/visual devices, such as speakers, sounders, buzzers, microphones, cameras, video displays, video screens, and other detector devices, among other types of alarm system devices.

These alarm system event detection devices 106 can be automatic, self-test devices, such as smoke detectors, heat detectors, CO detectors, and/or others. Such self-test devices can include mechanisms that generate aerosols, heat, carbon monoxide, etc. and sense these items as appropriate to the type of device being tested in the device to test the performance of the device. This can, for example, be to test the event detection device's thermal, chemical, and/or photo sensing capabilities. Such a test can be initiated automatically, for example via instructions from the control panel software and/or initiated with user input, for example, through a portable device, remote device, or control panel.

The alarm system event detection devices 106 utilized in the embodiments of the present disclosure each include communication components (e.g., transmitters, receivers, transceivers) that allow them to directly or via another device of the system communicate with a portable device 121, carried by a technician or emergency responder, for example. This collaboration between the portable device 121 and the system event detection devices 106, allow for the enhanced guidance functions described herein.

The alarm system 102 can also include an edge/gateway device 110. The gateway device 110 acts as a pass-through device for communicating between the alarm system 102 at the facility and the central monitoring station 108 and other components of the event notification system 100 that are at remote locations (i.e., outside the facility).

A gateway device 110 of an alarm system 102 at a facility (building) can, for example, report event alarm signals to one or more central monitoring servers. These servers may be on premise (within the facility) or, as shown in the example of FIG. 1, off premise (at a remote location from the alarm system components including the event detection devices 106, the gateway device 110, and the control panel 104).

From there, the event alarm signals can, for example, be reported to the appropriate central monitoring station. This is done through the computing device 108. For example, information about event alarm signals may be displayed on a graphical user interface of a remote or local application on the computing device 108.

The central monitoring station includes administrators that, as discussed above, coordinate activities to respond appropriately based on the type of event that is occurring. For example, a fire event would need a fire-based response that would likely include alerting a fire station to send trucks and contacting medical personnel, if injuries seem likely. The information provided could include the type of fire so that emergency responders know whether they will need water or foam to put the fire out.

For a security issue, security personnel and/or the police would be contacted. For an issue relating to the operation of an alarm system device 106, a technician would be contacted and directed to the location of the faulty alarm system event detection device 106. The central monitoring servers are connected back to one or more alarm systems on site and/or remote (cloud) servers, such as alarm system 102 and remote server 118.

Event alarm signals can also be transmitted to the remote server 118. These signals may include, for example, the time and date of the event, a network name, a unique identifier of the event detection device(s) 106 which detected the event, an event type, or an event status.

The remote server 118 may transmit this information to authorized users through portable device 121. For example, device 121 may be a mobile application accessible through a portable device, such as a mobile, phone, tablet, or laptop computing device.

In some current implementations, this information is represented only textually. Although a very experienced user who knows the building incredibly well may be able to decipher the location of the event based on information provided, such as the unique event detection device identification number, most users will not be able to determine the exact location within a floor of the event through text representation on device 121 alone.

Floorplans of each floor of the building may be accessible through the computing device 108. For example, such floorplans may be stored in the memory of the computing device 108. These building floorplans may be configured to include specific locations of all of the alarm system event detection devices 106. These floorplans may be accessed, and portions of the plans may be transferred to device 121 to enable the creation of a visual floor representation as described herein.

The floorplan information and location information of the event detection devices can be derived from BIM files stored in memory. For example, a remote server can include a memory wherein floorplans of each floor of the building are stored therein and wherein the computing device accesses the floorplans and uses data from the floorplans to create the visual floor representation. Once updated with the geofencing locations the visual floor representation is transmitted to the remote server from the first computing device, for example, the information can be transmitted to the first computing device through a gateway device.

Figure 2:
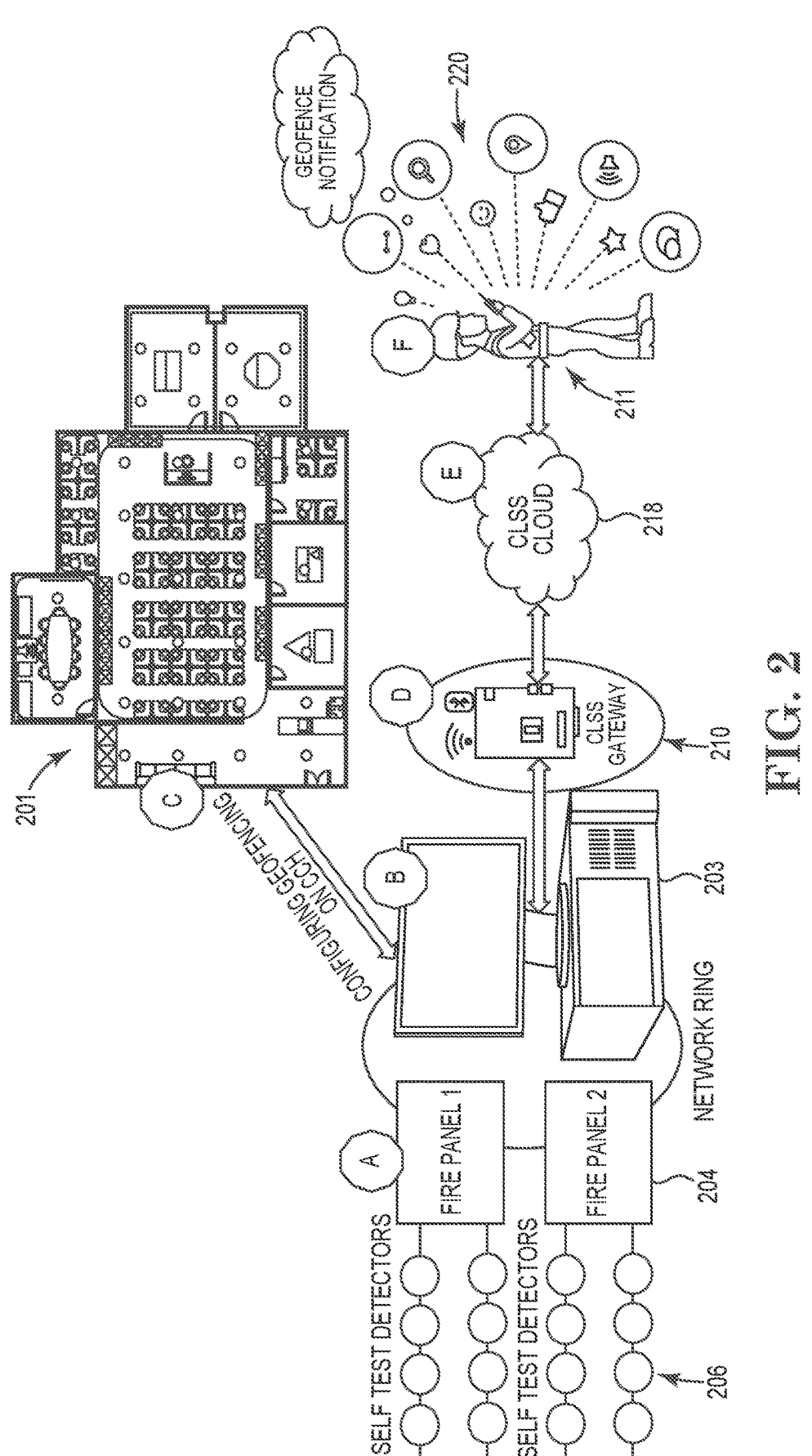
FIG. 2 is another example of an event alarm system in accordance with one or more embodiments of the present disclosure.

FIG. 2 is another example of an event alarm system having multiple alarm system event detection devices connected to multiple fire panels 204. The devices 206 being organized in areas of a facility and communicating with a portable device in accordance with one or more embodiments of the present disclosure. When an event detection device detects an event, the control panel can report the event detection to all end points (e.g., devices 110, 120, 121 188, and 108 of FIG. 1).

One or more of these devices can reference data stored in memory and can create a visual display of the location of the event on a facility layout 201. For example, as discussed above, a building floorplan can be accessed that contains the location of each event detection device 206 within the building. These locations can, for example, be entered into memory and/or onto the floorplan 201 (e.g., a jpg format file or other suitable visual file format) during a commissioning of the alarm system process, wherein the system is set up and made operational.

Figure 3:
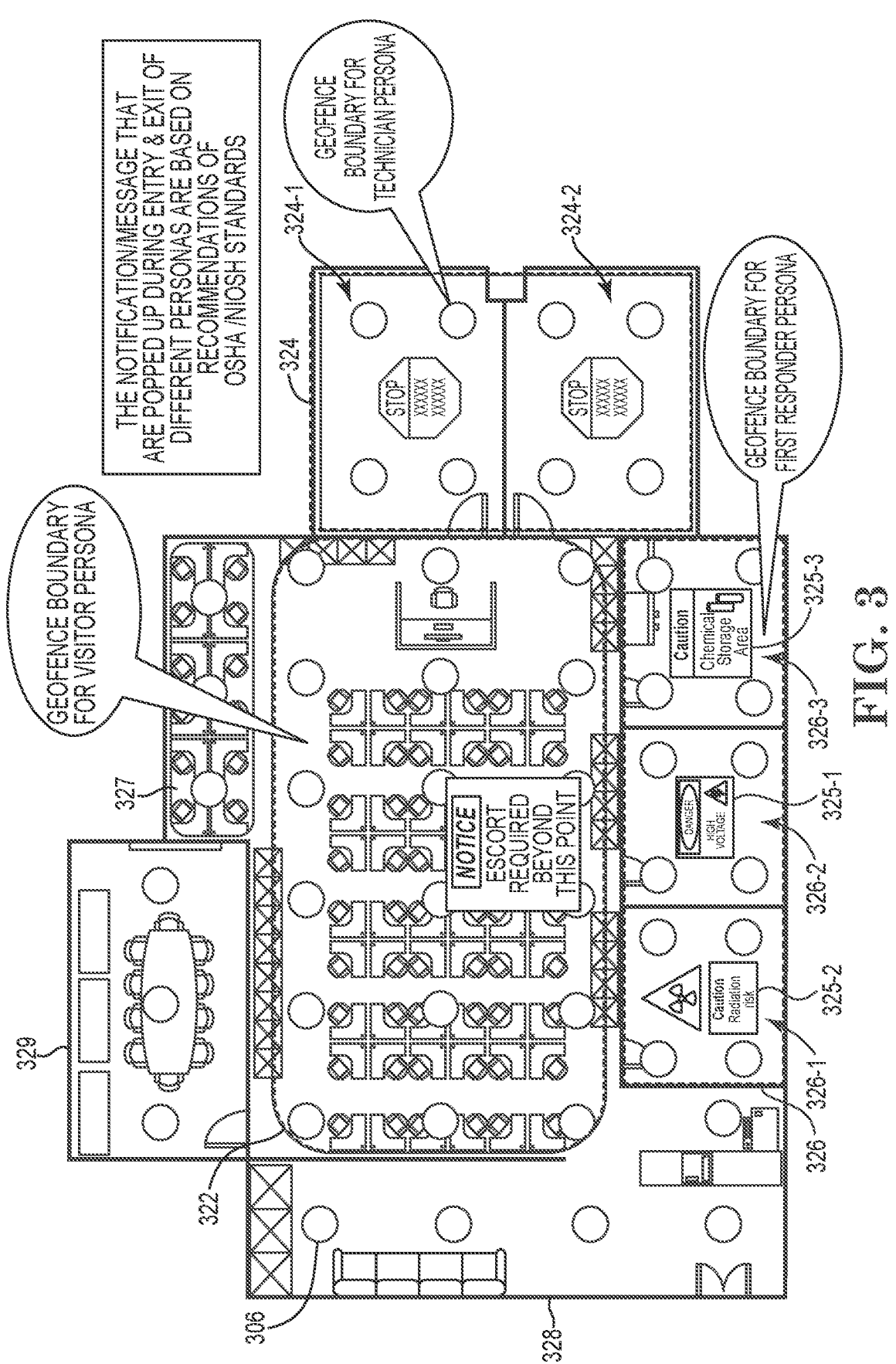
FIG. 3 is an example of an event alarm system having multiple alarm system event detection devices organized in areas of a facility and communicating with a portable device in accordance with one or more embodiments of the present disclosure.

During commissioning, the commissioning technician can determine physical locations for each of the event detection devices on a floor and position device indicators, for example, by dragging and dropping an indicator for each of the event detection devices 206 to the location on the floorplan that corresponds to the physical location of each event detection device (e.g., shown as circles 306 representing physical locations of each device in FIG. 3), thereby creating a map of the physical location of each device in the area shown on the map. For instance, during commissioning on a computing device 203 that is networked to the alarm system (devices 206 and panels 204), the technician can pull up the floorplan for building #1, floor #4 and the technician will verify that each event detection device is correctly located on the floorplan (i.e., its location on the floorplan correctly corresponds to its physical location on floor #4). The technician can then use the information about these devices 206 and their physical locations to define geofenced areas within the facility. Geofenced areas can, for example, define areas with different access restriction levels or occupant risk levels, among other defining criteria, as discussed in more detail below.

Once configured, the modified floorplan and geofencing data 220 can be provided to the emergency responder or technician performing maintenance 211 (e.g., via the gateway 210 and/or cloud server 218). In this manner, the emergency responder or technician performing maintenance 211 can have enhanced guidance tools available to them as they traverse through the facility.

FIG. 3 is an example of an event alarm system having multiple alarm system event detection devices organized in areas of a facility and communicating with a portable device in accordance with one or more embodiments of the present disclosure. FIG. 3 represents a visual floor representation, here, the floorplan of building #1, floor #4.

In this example, the floor includes multiple spaces. These spaces can be defined by walls or can be portions of larger spaces within the facility. The floorplan also includes a number of doors or walkways allowing movement between spaces. Additionally, the floorplan includes the locations of multiple event detection devices 306 that correspond to their physical location in these spaces of the floor.

In FIG. 3, the floor includes spaces 324, 326, 327, 328, and 329. Within area 324 are rooms 324-1 and 324-2 and within area 326 are rooms 326-1, 326-2, and 326-3. Further, some areas have been geofenced with different rules for different occupants of the space (e.g., visitor persona, first responder persona, fire warden persona, technician persona).

These geofenced areas are identified by different dashed areas 322, 324, and 326 which indicate the specific location of the geofenced area on the display of the portable device. The different dashes represent that each area has different issues with respect to access. Other areas, such as 329 and 327 have no geofencing.

Geofencing is described as defining virtual fences (boundaries or perimeters) around a real-world physical location. Passing through a boundary of a geofenced area can trigger an event, alarm, and/or action when entering and/or leaving the geofenced area.

This information can, for example, be used to support advanced logics, such as data gathering, time of presence, duration of stay, and time out conditions of a person in or having left the geofenced area. This information can, for instance, be used to know the location of a person, the time they have been in a geofenced area, time they have been outside the geofenced area, which can be used to alert system personnel, security, and/or the person being tracked with respect to the geofenced area that they have been in the area too long, have been outside the area for too long, and/or that they are approaching a time limit regarding time in and/or time out of the geofenced area.

One criterion used for geofencing can be the types of combustible materials existing in different areas of the facility. They, for example, can be combustible versus non-combustible materials, areas with furniture versus open/warehouse areas or other non-furniture areas, chemicals, toxic materials, explosives, etc.

Another criterion can be the types of use of certain areas. They can, for example, be office areas, lecture hall, conference rooms, research areas, clean rooms, security restricted areas, computer areas, etc.

Further, a geofencing criterion can be based on level of access restriction. For example, these can include unrestricted, escort mandatory, personal protection equipment required, restricted, no access allowed, etc.

Geofencing information can be used for many purposes. For example, it can provide guidance in determining a path for technicians or emergency personnel (e.g., avoiding risky and/or restricted areas, such as areas with heightened flammable risk due to combustibles, hazardous materials areas, etc.). Geofencing can be used to indicate to visitors where they can and/or cannot go within the facility and/or information about how to gain access to an area (e.g., key location, contact information for person to grant access).

The geofencing areas can be established during commissioning of the system and/or updated during maintenance of the system. A geofenced area is defined by grouping alarm system event detection devices that can communicate with a portable device with neighboring devices that are located within the area to be geofenced such that they can define when a portable device is within and/or has left a geofenced area.

For example, in some embodiments, the mere ability of a portable device to communicate (e.g., Bluetooth/BLE) with a device 306 within geofenced area 322 is sufficient to determine whether the portable device is within the geofenced area. In other embodiments, signal strength between the portable device and multiple event detection devices can be used to locate (e.g., triangulate) the portable device with respect to the event detection devices it is communicating with.

Similarly, a proposed boundary of the geofenced area can be determined based upon a signal strength of each event detection device in adjacent to the proposed boundary. These signal strength values can be stored in memory and can be referenced to determine if a portable device is approaching or has crossed the boundary.

Geofencing monitoring software can be located on any suitable computing device, but is preferably located in system control panel, gateway, or a system networked device. This software communicates with software on the portable device to provide various enhanced information providing and/or guidance functions described herein.

Geofencing software can present a notification of an access restriction for the geofenced area on the visual floor representation. In such an embodiment, the computing device that manages the geofencing functionality for the facility sets one or more access restrictions limiting when the portable device can access the geofenced area. Included in the restrictions that can be assigned to geofenced area are hazard indicators that can be presented to the portable device user.

The geofencing software can also track movement of the portable device based on its communication with different ones of the event detection devices. The position of the portable device can be shown on the visual floor representation and can be updated based on the communication with the different ones of the event detection devices.

As discussed herein, the computing device can also create a number of personas wherein each persona allows for setting a different access restriction. Once the personas have been created, a portable device user selects one of the personas to represent the access rights of the portable device to the geofencing software thereby defining the access restrictions for the portable device.

Once the geofencing is activated, the system can be set to provide geofencing information when a portable device user (e.g., visitor/first responder/technician/fire warden, etc.) arrives at the facility, arrives at a building within the facility, arrives at a floor at a facility, and/or arrives at a geofenced area. For example, the geofencing information can be related to access restrictions to that geofenced area and/or conditions within the geofenced area.

Additionally, in some embodiments, the information provided is based on the persona of the intended portable device user. For instance, the geofencing information sent to a technician will likely be different than that sent to a first responder.

Different personas can also be created for subgroups within these larger groups of users. For example, medical first responders may get different information than fire first responders or different types of technicians may get different information based on what it is that they are working on within the facility. However, embodiments of the present disclosure allow for the creation and use of these multiple, different personas with multiple portable devices that may access the facility.

As discussed above, software on the portable device can provide a map for the user to view, such as that provided in FIG. 3. In such an embodiment, the floorplan can be depicted on the display of the portable device. The portable device software can be configured with a single persona and therefore the displayed floorplan may only include the geofence information for that single persona (e.g., geofence boundaries. However, here, several different geofence boundaries for different personas are illustrated. This may be a useful view for a geofencing system operator or technician.

In FIG. 3, icons indicating access are displayed. For example, geofenced rooms 324-1 and 324-2 each have a stop icon indicating access is restricted to those rooms. Here, the geofence is defined by the short range communication range of the eight event detection devices (represented by circles) located within the area 324. In some embodiments, the boundaries with adjacent spaces can be refined using signal strength measurements of each event detection device on either side of the geofencing border being established. This data can be stored in memory and used by the geofence monitoring software to determine and monitor the geofence boundary.

FIG. 3 also illustrates hazard icons that can be provided on displays for some personas. The areas illustrated regarding rooms 326-1, 326-2, and 326-3 of area 326. In these areas the nature of the risk to people accessing these rooms is provided (e.g., 325-1 indicates high voltage, 325-2 indicates a radiation risk, 325-3 indicates a chemical risk). These icons can be beneficial in alerting the user of the portable device to the risks in accessing those areas. It also can allow them to be properly equipped (e.g., specialized radiation related equipment, knowledge of the risk before access so the user can develop a shortened access plan to get in and out quickly, etc.).

Additionally, geofenced area 322 includes an icon indicating that an escort is required outside of area 322. The puts the user of the portable device on notice that they should not leave the area 322 unescorted.

Figure 4:
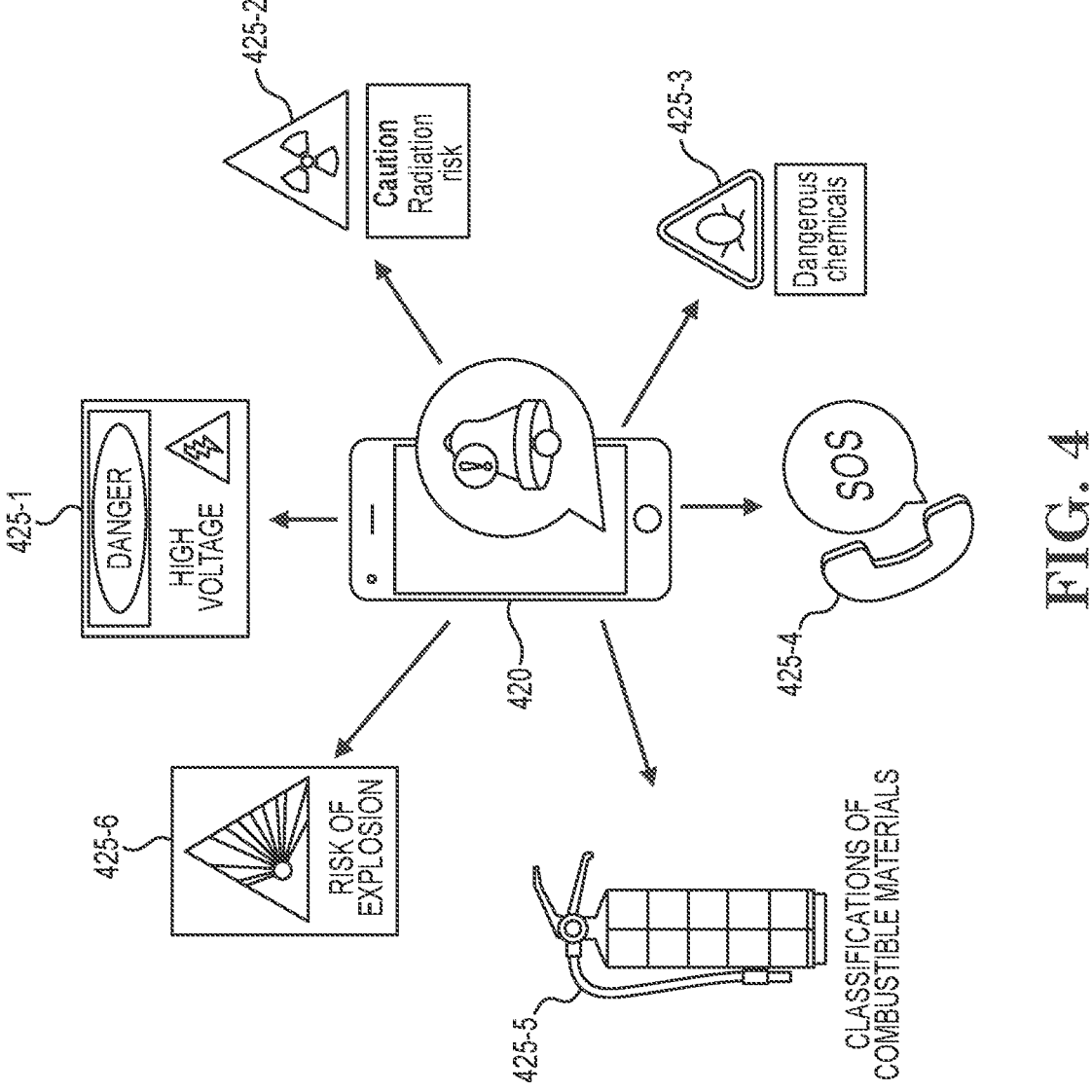
FIG. 4 represents a number of alert conditions that can be communicated to a user's device according to an embodiment of the present disclosure.

FIG. 4 represents a number of alert conditions that can be communicated to a user's device according to an embodiment of the present disclosure. In this example, several icons that were used in FIG. 3 are shown (425-1, 425-2), but several new icons are provided as additional examples of information that can be provided to the user of the portable device. The icons shown include a warning about explosion risk 425-6, classifications of flammable materials 425-5 in the geofenced area, a location of an SOS request for assistance 425-4, and an indicator of dangerous chemicals 425-3. Each of these can assist the user in understanding what may be going on in the geofenced area, what equipment to bring, and/or may aid in forming an action plan for their time in the area.

Additionally, alarm system event detection device data can be used to inform the portable device user of potential conditions in the geofenced area. Two such examples are provided below in FIGS. 5 and 6.

FIG. 5 is an example of an event occurring on an event alarm system in accordance with one or more embodiments of the present disclosure. In the embodiment of FIG. 5, the geofenced area 526-2 is experiencing an event while areas 526-1, 526-3, and 522 (bounded by dashed line 522-1) are not. The information about adjacent areas can be helpful in determining an action plan for accessing the space having the event and/or resolving the issue causing the event, among other benefits.

A floorplan is illustrated and would be displayed on the display of portable device 520 which would be configured for an emergency responder with an emergency responder persona configured thereon. In the example of FIG. 5, the event detection devices 506 include thermal sensors. The thermal sensor data 530 from the detectors 506 in the geofenced area 526-2 indicates a temperature of 200 degrees Celsius. This information can then be used in advance of the user entering the geofenced area to obtain the correct equipment and formulate a plan. Other icons 525-1, in this area 526-2 and other adjacent areas can be beneficial as icon 525-1 may indicate the event's source may have been or may be electrical meaning specialized equipment, personnel, and action plan for dealing with an electrical fire may be necessary to resolve this issue.

Icons in adjacent areas may provide additional context to the issue. For example, flammable materials in an adjacent area may indicate an urgency to resolve the issue causing the event or may indicate that area should be avoided to reduce the risk of the fire spreading to the area with the flammable material.

In embodiments of the present disclosure, when an event is detected, the control panel can instruct the event detection devices to each activate a short range communication functionality (e.g., Bluetooth, Bluetooth low energy (BLE), infrared, near field communication, ultraband, Zigbee). In some embodiments, the control panel can initiate this process when instructed from a remote server (e.g., device 118 of FIG. 1), for example.

In some embodiments, the created floorplan map can be stored in memory and can be accessed in the future when a technician/emergency personnel carrying a portable device needs to get to this particular event detection device. This implementation can be beneficial in quickly getting the portable device user moving toward the event indicating device.

As shown in FIG. 5, the display can also be provided with temperature index data 532 to assist the user in formulating an action plan. Alternatively, this information can be communicated by a risk level indicator (e.g., changing a color of a geofenced area on the floorplan from green, to yellow, to orange, to red as the risk level increases. Any type of indicator can be used. Further, in some embodiments, the risk level for adjacent areas can be calculated (e.g., materials stored in the adjacent geofenced area, proximity to the area having the event, data from event detection devices in the adjacent geofenced area, etc.) and illustrated by indicators. This can give emergency responders guidance as to the risk of the event spreading to adjacent areas.

FIG. 6 is another example of an event occurring on an event alarm system in accordance with one or more embodiments of the present disclosure.

A floorplan is illustrated and would be displayed on the display of portable device 620 which would be configured for an emergency responder with an emergency responder persona configured thereon. In the example of FIG. 6, the event detection devices 606 include photo sensors in a geofenced area adjacent to area 622 (bounded by dashed line 622-1). The photo sensor data 636 from the detectors 606 in the geofenced area indicates an opacity value of 80%. As in FIG. 5, this information can then be used in advance of the user entering the geofenced area to obtain the correct equipment and formulate a plan.

As shown in FIG. 6, the display can also be provided with smoke opacity score index data 634 to assist the user in formulating an action plan. Alternatively, this information can be communicated by a risk level indicator (e.g., changing a color of a geofenced area on the floorplan from green, to yellow, to orange, to red as the opacity level increases. Any type of indicator can be used.

In some embodiments, when commissioning is complete, the alarm system is placed into normal operation (i.e., monitoring mode). In this mode, if an event is detected, an indicator at the device 606 that detected the event will be actuated (e.g., change of color of the indicator for event detection device 606 making it different than the other event detection device indicators, the background behind the indicator for event detection device beginning to flash, etc.). Any suitable type of indicator can be utilized.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method, comprising:

defining a geofenced area within a facility, the geofenced area defined by a communication range of a communication functionality of at least one of a number of event detection devices of a facility event detection alarm system;

using the communication functionality to communicate between the number of event detection devices and a portable device wherein the portable device and at least one of the event detection devices are within a threshold communication range of each other;

determining whether the portable device is within the geofenced area based on the communication between the portable device and at least one of the event detection devices; and providing information specific to another geofenced area that is adjacent to the geofenced area, wherein the information is descriptive of an event occurring in the facility.

2. The method of claim 1, wherein the method further includes creating a visual floor representation, including an indication of a specific location of the geofenced area on a display of the portable device.

3. The method of claim 2, wherein the method includes transmitting the visual floor representation to a remote server.

4. The method of claim 1, wherein the communication functionality is Bluetooth low energy.

5. The method of claim 1, wherein the method further includes determining physical locations for each of the event detection devices on a floor and positioning device indicators in locations on a visual floor representation corresponding to each event detection device's physical location.

6. The method of claim 1, further comprising tracking movement of the portable device based on its communication with different ones of the event detection devices.

7. The method of claim 6, further comprising, updating the specific location of the portable device on a visual floor representation based on the communication with the different ones of the event detection devices.

8. The method of claim 1, wherein a proposed boundary of the geofenced area is determined based upon a signal strength of each event detection device in adjacent to the proposed boundary.

9. The method of claim 1, further comprising presenting a notification of an access restriction for the geofenced area on a visual floor representation.

10. A system, comprising:

a number of event detection devices configured to detect an event within a building; and an alarm system control panel configured to receive information about the event or event detection devices and transmit the information to a computing device;

wherein the computing device is configured to:

define a geofenced area within a facility, the geofenced area defined by a communication range of a communication functionality of at least one of a number of event detection devices of a facility event detection alarm system;

use the communication functionality to communicate between the number of event detection devices and a portable device wherein the portable device and at least one of the event detection devices are within a threshold communication range of each other;

determine whether the portable device is within the geofenced area based on the communication between the portable device and at least one of the event detection devices; and provide information specific to another geofenced area that is adjacent to the geofenced area, wherein the information is descriptive of an event occurring in the facility.

11. The system of claim 10, wherein the computing device sets an access restriction limiting when the portable device can access the geofenced area.

12. The system of claim 10, wherein the computing device creates a number of personas wherein each persona allows for setting a different access restriction.

13. The system of claim 10, wherein a remote server includes a memory wherein floorplans of each floor of the building are stored therein and wherein the computing device accesses the floorplans and uses data from the floorplans to create a visual floor representation.

14. A method, comprising:

defining a geofenced area within a facility, the geofenced area defined by a communication range of a communication functionality of at least one of a number of event detection devices of a facility event detection alarm system;

using the communication functionality to communicate between the number of event detection devices and a portable device wherein the portable device and at least one of the event detection devices are within a threshold communication range of each other;

determining whether the portable device is within the geofenced area based on the proximity of the portable device and the at least one of the event detection devices determined via communication between the portable device and at least one of the event detection devices; and providing information specific to another geofenced area that is adjacent to the geofenced area, wherein the information is descriptive of an event occurring in the facility.

15. The method of claim 14, wherein the method further includes creating a visual floor representation, including an indication of a specific location of the geofenced area on a display of the portable device.

16. The method of claim 14, wherein the method further includes determining physical locations for each of the event detection devices on a floor and positioning device indicators in locations on a visual floor representation corresponding to each event detection device's physical location.

17. The method of claim 14, further comprising tracking movement of the portable device based on its communication with different ones of the event detection devices.

18. The method of claim 14, further comprising, updating the specific location of the portable device on a visual floor representation based on the communication with the different ones of the event detection devices.

* * * * *